United States Patent
Pampus

(10) Patent No.: US 9,045,160 B2
(45) Date of Patent: Jun. 2, 2015

(54) METHOD AND DEVICE FOR ASSISTING THE DRIVER OF A MOTOR VEHICLE

(75) Inventor: Christian Pampus, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 963 days.

(21) Appl. No.: 12/927,802

(22) Filed: Nov. 23, 2010

(65) Prior Publication Data

US 2011/0140921 A1   Jun. 16, 2011

(30) Foreign Application Priority Data

Nov. 30, 2009   (DE) .......................... 10 2009 047 283

(51) Int. Cl.
*G08G 1/14*       (2006.01)
*B62D 15/02*      (2006.01)

(52) U.S. Cl.
CPC .................................. *B62D 15/027* (2013.01)

(58) Field of Classification Search
CPC ............ B60T 2201/10; B62D 15/0285; B62D 15/027; B62D 15/028; G08G 1/14; G08G 1/166; G01S 2013/9389; G01S 13/931
USPC ............ 340/932.2, 435, 436, 903; 701/1, 36, 701/41, 42, 300, 301, 28; 180/199, 204, 180/200, 402
See application file for complete search history.

(56) References Cited

U.S. PATENT DOCUMENTS

| | | | | |
|---|---|---|---|---|
| 7,492,282 | B2 * | 2/2009 | Danz et al. | 340/932.2 |
| 7,924,171 | B2 * | 4/2011 | Kawabata et al. | 340/932.2 |
| 8,018,351 | B2 * | 9/2011 | Hering et al. | 340/932.2 |
| 8,081,539 | B2 * | 12/2011 | Faber et al. | 367/98 |
| 8,269,616 | B2 * | 9/2012 | Uehara | 340/435 |
| 8,378,850 | B2 * | 2/2013 | Toledo et al. | 340/932.2 |
| 2005/0236201 | A1 * | 10/2005 | Spannheimer et al. | 180/204 |
| 2009/0128364 | A1 | 5/2009 | Lee | |
| 2009/0259365 | A1 * | 10/2009 | Rohlfs et al. | 701/41 |
| 2010/0274446 | A1 * | 10/2010 | Sasajima et al. | 701/36 |
| 2012/0004809 | A1 * | 1/2012 | Sasajima | 701/41 |

FOREIGN PATENT DOCUMENTS

| | | |
|---|---|---|
| DE | 10 2005 032 095 | 1/2007 |
| DE | 10 2006 052 575 | 5/2008 |
| EP | 2 011 699 | 1/2009 |
| WO | WO 2008/055567 | 5/2008 |

* cited by examiner

*Primary Examiner* — Hung T Nguyen
(74) *Attorney, Agent, or Firm* — Kenyon & Kenyon LLP

(57) ABSTRACT

In a method for assisting a driver of a motor vehicle during a parking process, the surroundings of the vehicle are recorded during travel, and with the aid of the surroundings pattern recorded, it is ascertained whether there is a parking space and whether the parking space is a parallel parking space or a perpendicular parking space. Before the beginning of the parking process, the driver of the vehicle may indicate whether the parking space is a parallel parking space or a perpendicular parking space, or a parking space is recognized as a perpendicular parking space if, on at least one side of the parking space, an object is detected, and no additional non-moving object is detected in the area of the possible parking space.

6 Claims, No Drawings

METHOD AND DEVICE FOR ASSISTING THE DRIVER OF A MOTOR VEHICLE

BACKGROUND OF THE INVENTION

1. Field of the Invention

The present invention relates to a method for assisting the driver of a motor vehicle during a driving maneuver. e.g., a parking process.

2. Description of Related Art

Different systems are known for assisting a driver during a parking process. These systems assist the driver especially during parking in a parallel parking space. In such systems, while the car is passing a parking space, the distance from objects next to the vehicle is usually measured by a sensor mounted on the side of the vehicle. With the aid of the signal curve ascertained, it is detected where there is a suitable parking space.

When one parks in a parking space thus ascertained, the system for assisting the driver of the vehicle, during the parking process, takes over the actual steering process, while the driver merely has to operate the brake and the accelerator. The steering intervention by the system, in this context, takes place so that the vehicle to be parked both steers past objects bordering on the parking space and also finally stands parallel to a roadway border, such as a curb. Alternatively to systems in which the steering process is taken over by the vehicle, systems are also on the market in which the driver still has to steer himself, but receives instructions from the system as to how he has to steer in each case so as to enter into the parking space.

However, since only a part of all parking spaces are parallel parking spaces, systems are further known which besides parallel parking spaces also detect perpendicular parking spaces. Driving into such perpendicular parking spaces preferably takes place backwards, in this instance. For this parking process, assistance to the driver should also be offered.

In order to be able to assist the driver during parking, it is necessary that the system detects whether a parallel parking space is present or a perpendicular parking space. A method is known, for instance, from published German patent application document DE 10 2005 032 095, in which the alignment of a vehicle bordering on the parking space is ascertained, and from the alignment of the vehicle one draws a conclusion on the orientation of the parking space.

The disadvantage of the known system is, however, that not only parking spaces are detected, using the known systems, but also free regions that do not represent parking spaces. The reason for this is particularly that, when ultrasonic sensors are used as distance sensors, a perpendicularly parked vehicle in the ultrasonic sensor image cannot always be reliably distinguished from other objects, such as round ones. In addition, based on the depth of a perpendicular parking space, a curb can generally not be detected by the ultrasonic sensor, and its detection may consequently not be made a condition for the existence of a perpendicular parking space. This leads to individual objects, which in the ultrasonic image resemble a perpendicularly parked vehicle, being sufficient for outputting a perpendicular parking space. The quality of the parking space indication is thereby drastically reduced.

BRIEF SUMMARY OF THE INVENTION

In the method according to the present invention, for assisting the driver of a motor vehicle, in a parking process during the drive, the surroundings of the vehicle are recorded and, with the aid of the recorded surroundings pattern, it is ascertained whether there is a parking space, and whether the parking space is a parallel parking space or a perpendicular parking space. Before the parking process, the driver of the vehicle indicates whether the recorded parking space is a parallel parking space or a perpendicular parking space, or a parking space is recognized as a perpendicular parking space if, on at least one side of the parking space an object is detected, and no additional non-moving object is detected in the area of the possible parking space during driving by.

The method according to the present invention permits an unequivocal assignment as to whether a detected parking space is a parallel parking space or a perpendicular parking space.

DETAILED DESCRIPTION OF THE INVENTION

In one example embodiment of the present invention, the driver indicates whether subsequently recorded parking spaces are parallel parking spaces or perpendicular parking spaces, before a suitable parking space is selected.

A preselection by the driver of the vehicle as to whether the parking spaces subsequently found are parallel parking spaces or perpendicular parking spaces is possible, for instance, if a clear assignment of the following parking spaces to be found can be made. This is the case, for example, if a parking space to be found is a parking space at the edge of the street. These are generally parallel parking spaces. These are usually bordered by a vehicle in front and one in the rear in their longitudinal extension. The lateral bordering of such a parallel parking space is usually formed by a curb. Alternatively, it is, however, also possible that the lateral bordering is formed, for instance, by plants, hedges, for example, or other plantings, posts, lamp posts or similar objects. It is also possible that the lateral bordering is formed by a wall, for instance, an enclosing wall or even a house wall.

A clear assignment is similarly possible if the parking space to be found is to be detected in a parking garage or on a large parking lot. In this instance, generally perpendicular parking spaces are involved, so that here too, the driver may make a selection ahead of time that, subsequently perpendicular parking spaces are to be searched for. Perpendicular parking spaces are usually bordered laterally by additional parking vehicles. In particular, on parking lots or in parking garages, the front bordering of a perpendicular parking space is a further vehicle in a perpendicular parking row or even a built-up bordering, such as posts or guardrails. The bordering may also be formed by a curb, for example. Based on the depth of perpendicular parking spaces, the rear bordering of a perpendicular parking space is generally not recorded during driving by and recording the surroundings of the vehicle. It is also possible, for instance, in the case of several free parking spaces lying side by side in the case of perpendicular parking spaces, or in the case of several parking spaces lying one behind the other, that a parking space is bordered only on one side, in the case of perpendicular parking space either on the left side or on the right side, and in the case of parallel parking spaces has a front or a rear bordering. This is also the case in the first or last parking space in a row. In such a case, in which the parking space has only a one-sided bordering, assistance to the driver is generally not required, since driving into such a parking space is very much easier than driving into a parking space that is bordered on three sides.

The selection by the driver, as to whether the parking spaces recorded in the following are parallel parking spaces or perpendicular parking spaces, may be made by operating a switch, for example. It is also possible to carry out the selection by operating an input device for an onboard computer, for instance, a multi-function switch, which may be designed as a rotating switch or a toggle switch or a push-button switch.

In one alternative example embodiment, a parking space is recognized as a perpendicular parking space if on at least one side of the parking space an object is detected, and no additional non-moving object is detected within the range of the possible parking space while driving by. In this way, an unequivocal assignment is also possible as to whether the detected parking space is a perpendicular parking space or a longitudinal parking space. Furthermore, this has the advantage that it does not have to be specified by the driver of the vehicle, ahead of time, whether the parking spaces found subsequently are parallel parking spaces or perpendicular parking spaces.

If the decision is made, as to whether the parking space encountered is a perpendicular parking space, takes place only in the light of the criteria that the parking space is bordered on at least one side, and furthermore, no moving object is detected in the area of the possible parking space during driving by, it is, however, also possible that an area, in which, to be sure, no object is located, but which is no parking space, is nevertheless recognized as a parking space.

Thus, for instance, a free area next to the last parking space or next to the first parking space in a row is also recognized as a parking space, although a free parking lot is no longer involved. In order to improve the robustness of the system, and to avoid that free areas, in which no objects are detected, but which are not a parking space, are identified as a parking space, it is preferred that a parking space is recognized as a perpendicular parking space only if objects are detected on both sides of the parking space, so that the parking space is bordered on both sides. Because of the bordering on both sides of the parking space, it is particularly avoided that an area next to the last vehicle or next to the first vehicle in a row is recognized as a parking space. In this way, to be sure, it is possible that free parking spaces located respectively at the end or the beginning of a row are not detected, but in this case there is the possibility for the driver to do without assistance during the parking process, and to park automatically in such a parking space. Thus, no longer all parking spaces are recognized by the method, but the probability that a free area is recognized as a parking space, which is not a parking space, is greatly reduced.

If a first parking space in a row, or a last parking space in a row is to be detected, it is possible, for instance, that a parking space is output as a perpendicular parking space if it represents a free parking space at the end of a row of perpendicularly parked vehicles. For this purpose, the previously recorded data are appropriately analyzed, in order to find out whether the detected objects could be perpendicularly parked vehicles. In order to output a free parking space at the beginning of a parking row, for example, the previously recorded data may also be used. This comes about, for instance, when driving past a series of parking rows.

In another example embodiment of the present invention, a parking space is recognized as a perpendicular parking space if the distance between the two detected objects is shorter than the required distance for a longitudinal parking space. Because of the distance between the two detected objects, which is shorter than the required distance for a longitudinal parking space, an additional criterion is provided for the selection of a perpendicular parking space.

If it is to be ascertained, by the method according to the present invention, whether a detected parking space is a parallel parking space or a perpendicular parking space, then, in a manner that is different from that in systems that are only able to detect longitudinal parking spaces, a parking space, in which the distance between the two detected objects is shorter than the required distance for a longitudinal parking space, is first not excluded as an unsuitable parking space. The assumption is made that this could be a perpendicular parking space. In order to find a clear assignment as to whether it is actually a perpendicular parking space, one must then apply additional selection criteria. Thus, according to the present invention, one should check especially whether a non-moving object is detected in the area of the possible parking space. If no non-moving object is detected, one may assume with great probability that a perpendicular parking space is involved. If a non-moving object is detected, the space should be rejected, because it is too short for both a longitudinal and for a perpendicular parking space.

In order to be able to make a selection as to whether a detected space is a longitudinal parking space or a perpendicular parking space, a parking space is recognized as a parallel parking space if, during driving by, a bordering is detected parallel to the vehicle, and the distance between two detected objects, which form a front bordering and a rear bordering of a parallel parking space, is sufficiently large. In addition, the distance from the bordering parallel to the vehicle has to be sufficiently large to make parking the vehicle possible. This means that the bordering parallel to the vehicle is detected at a distance of least one vehicle width from the vehicle that is to be parked.

Such a bordering parallel to the vehicle is a curb, for example. Such a bordering, as was described above, may also be formed by one or more plants, such as a hedge, or by posts or barrier devices, or even a wall used as a property demarcation or even a building wall. In general, a bordering parallel to the vehicle will be a curb, since longitudinal parking spaces are usually located at the edge of the roadway, and there is generally a sidewalk next to parallel parking spaces.

In order to record the surroundings of the vehicle, distance sensors are usually used in the front part and in the rear part of the vehicle, at least one distance sensor on each side of the vehicle recording the region next to the vehicle. Recording the region next to the vehicle is necessary particularly to detect whether objects are located next to the vehicle or whether there exists free space that may be a parking space. Any sensors known to one skilled in the art may be used to record the surroundings. Ultrasonic sensors, radar sensors, infrared sensors, capacitive sensors or LIDAR sensors are generally used as sensors. For the method according to the present invention, ultrasonic sensors, in particular, are used. Using the sensors, the distance between an object and the sensor is recorded. Recording the distance takes place by the running time of a signal that is emitted by the sensor, and whose echo is received again by the sensor. The data thus recorded are supplied to a suitable evaluation unit, using which the data are evaluated, and thus the direction and the distance from the object are ascertained. Besides the running time for determining the distance, evaluation methods by which the direction and the distance from the object are ascertained are triangulation methods or trilateration methods for directional determination. For directional determination, the data of at least two sensors are used, in this context.

In order to exclude a recorded object from being a moving object, a plurality of successive measurements is carried out, for example. If the position of the object in at least two successive measurements changes, a moving object is involved. Such a moving object may be a pedestrian, for example, who is crossing a potential parking space. If a moving object is detected, one should check whether the area in which the moving object is located is suitable as a parking space. For this purpose, only those data are evaluated that originate with non-moving objects.

In another example embodiment, it is also possible for the manual selection by the driver of the vehicle and the automatic evaluation of a parking space to be combined. This may be done, for instance, in such a way that parking spaces are first classified by the driver assistance system used for the automatic evaluation, as long as the driver has not made a manual selection. Because of the possibility of making a manual selection, the driver is basically able to override the system. When the driver has selected whether the recorded parking spaces are parallel parking spaces or perpendicular parking spaces, from then on, only the parking spaces selected by the driver, i.e. either perpendicular parking spaces or longitudinal parking spaces are indicated.

A parking space may be identified as a perpendicular parking space even if only a single object and a subsequent free space are detected, and the driver is preparing a parking process by carrying out a steering process away from the parking space, for instance, moving the vehicle to the left if the space is located on the right.

Using the method according to the present invention, when a parking space has been found, the driver is able to be assisted further in the parking process by a suitable system. For this purpose, a suitable parking trajectory is calculated from the recorded data, along which the vehicle is able to park in a parking space. Usually, the parking process, in this context, will take place backwards, both into a parallel parking space and into a perpendicular parking space. The trajectory along which the vehicle moves during the parking process is usually the path covered by the center point of the rear axle.

The assistance to the driver during parking may take place both semiautomatically and fully automatically. In a semiautomatic system, only the necessary steering setting is specified by the system, in each case. For this purpose, it is possible, on the one hand, that necessary steering angles are indicated to the driver via a suitable display device, and the driver automatically has to set the appropriate steering angle by operating the steering wheel. The indication may take place optically, for example, in a suitable display device, for instance, a monitor of an onboard computer. A representation by arrows is also possible, the steering wheel having to be turned in the direction of the arrow as long as the respective arrow is shown. In addition, or alternatively, it is, for instance, also possible to give the driver haptic information with regard to the respective steering wheel angle that is to be set. This may be done, for example, by a vibration on the steering wheel or by superimposing an additional torque which makes for an easing of, or an added difficulty in steering.

Alternatively, it is also possible for the steering of the vehicle to be done automatically, by using a suitable actuating drive. For this, the actuating drive is actuated by the evaluation unit which, in this case, acts simultaneously as a control unit, and the steering angles required in each case are set. In addition to the use of the evaluation unit as a control unit, one may also use a control unit that is separate from the evaluation unit, which then receives the appropriate data from the evaluation unit. The longitudinal guidance of the vehicle, that is, the braking processes and the acceleration processes are taken over by the driver in the semiautomatic method.

In a fully automatic system, the vehicle also takes over the longitudinal guidance, that is, the braking and the accelerating.

A device according to the present invention, for assisting a driver of a motor vehicle during a parking process includes distance sensors using which the distance from objects in the surroundings of the vehicle may be recorded, as well as an evaluation unit for ascertaining whether a recorded parking space is a perpendicular parking space or a parallel parking space, using the abovementioned method. In order to be able to estimate whether a recorded parking space is a perpendicular parking space or a parallel parking space, it is provided, on the one hand, that a corresponding switch is operated by the driver. This signal is passed on to the evaluation unit, so that the evaluation unit is unequivocally told that parking spaces discovered are either perpendicular parking spaces or longitudinal parking spaces.

Alternatively, a computer program is running in the evaluation unit, with the help of which the recorded data of the distance sensors are evaluated, so that a parking space is recognized as a perpendicular parking space if it is bordered at least on one side by an object, and if there is no additional, non-moving object located in the area of the possible parking space. In particular, the computer program running on the evaluation unit is designed so that a perpendicular parking space is only detected as being such, if objects are detected on both sides of the parking space, so that the parking space is bordered on both sides. In one preferred specific embodiment, a parking space is further recognized as a perpendicular parking space only if the distance between the two detected objects is shorter than the required distance for a longitudinal parking space.

The recorded data, with the aid of which it is recorded by the evaluation unit whether a parking space is involved, and then, furthermore, whether a parallel parking space or a perpendicular is involved, come about from the distances from objects recorded by the distance sensors. By measurement using the distance sensors, points in the surroundings of the sensors are recorded, in each case, which reflect a signal. The surroundings are able to be illustrated in light of the signal curve, which comes about from the running time of the signals from the sending to the receiving of the echo. The data recorded in each case are filed, for instance, in suitable data arrays, so that one may reaccess them for the further evaluation for the recording of parking spaces.

Suitable sensors known to one skilled in the art may be used as distance sensors. As was described above, ultrasonic sensors, radar sensors, infrared sensors, capacitive sensors and LIDAR sensors are suitable. Ultrasonic sensors, in particular, are used.

What is claimed is:

1. A method for assisting a driver of a motor vehicle in a parking process, comprising:
   recording data regarding surroundings of the vehicle originating from non-moving objects and moving objects during vehicle travel; and
   automatically ascertaining, with the aid of the recorded data of the surroundings originating from non-moving objects and moving objects, whether there are moving objects within a potential parking space, and, with the aid of data originating with non-moving objects, whether a parking space exists, and whether the parking space is one of a parallel parking space or a perpendicular parking space; and
   wherein one of the following conditions is satisfied:
   (a) before a beginning of the parking process, the driver of the vehicle indicates to the motor vehicle a parking space to be ascertained is one of a parallel parking space or a perpendicular parking space; or
   (b) a parking space is recognized as a perpendicular parking space based on the recorded data if an object is detected on at least one side of the parking space and no additional non-moving object is detected within the parking space; and wherein (i) a parking space is recognized as a perpendicular parking space if the parking space is detected at an end of a row of perpendicularly parked vehicles; or (ii) a parking space is recognized as a parallel parking space if the parking space is detected at an end of a row of longitudinally parked vehicles.

2. The method as recited in claim 1, wherein:

(i) a parking space at a beginning of a parking row is detected as a perpendicular parking space if previously recorded parking spaces in the parking row were detected as perpendicular parking spaces; or (ii) a parking space at a beginning of a parking row is detected as a parallel parking space if previously recorded parking spaces in the parking row were detected as parallel parking spaces.

3. The method as recited in claim 1, wherein the automatic ascertainment of whether the parking space is one of a parallel parking space or a perpendicular parking space takes place for as long as no manual selection by the driver regarding a type of parking space has taken place.

4. The method as recited in claim 1, wherein a parking space is ascertained as a perpendicular parking space if: (i) a single object and a free space adjacent to the single object are detected; and (ii) the driver prepares for the parking process by initially steering away from the detected free space.

5. The method as recited in claim 1, wherein at least one distance sensor is located in each of a front section, a rear section, a left side section and a right side section of the vehicle, and wherein the distance sensors are used to record the surroundings of the vehicle.

6. A device for assisting a driver of a motor vehicle during a parking process, comprising:

a plurality of distance sensors configured to record data of distances of non-moving objects and moving objects in surroundings of the vehicle to the respective sensors; and an evaluation unit configured to ascertain, with the aid of the recorded data of distances of non-moving objects and moving objects, whether there are moving objects within a potential parking space, and, with the aid of the recorded data of distances of non-moving objects, whether a parking space exists, and whether the parking space is one of a parallel parking space or a perpendicular parking space, wherein one of:

(a) before a beginning of the parking process, the driver of the vehicle indicates to the device a parking space to be ascertained is one of a parallel parking space or a perpendicular parking space; or (b) a parking space is recognized as a perpendicular parking space based on the recorded data if an object is detected on at least one side of the parking space and no additional non-moving object is detected within the parking space; and wherein (i) a parking space is recognized as a perpendicular parking space if the parking space is detected at an end of a row of perpendicularly parked vehicles; or (ii) a parking space is recognized as a parallel parking space if the parking space is detected at an end of a row of longitudinally parked vehicles.

* * * * *